United States Patent
Golden et al.

(10) Patent No.: US 10,475,064 B2
(45) Date of Patent: Nov. 12, 2019

(54) SYSTEM AND METHOD FOR OPTIMIZING THE PRESENTATION AND DELIVERY OF CONTENT

(71) Applicant: Moasis Global Corporation, San Francisco, CA (US)

(72) Inventors: Ryan Golden, Mountain View, CA (US); Jason Mascari, Rockford, MI (US)

(73) Assignee: MOASIS GLOBAL CORPORATION, San Francisco, CA (US)

( * ) Notice: Subject to any disclaimer, the term of this patent is extended or adjusted under 35 U.S.C. 154(b) by 1090 days.

(21) Appl. No.: 14/672,273

(22) Filed: Mar. 30, 2015

(65) Prior Publication Data

US 2015/0287072 A1  Oct. 8, 2015

Related U.S. Application Data

(63) Continuation of application No. PCT/US2014/032914, filed on Apr. 4, 2014.

(51) Int. Cl.
*G06Q 30/02* (2012.01)
*H04W 4/021* (2018.01)

(52) U.S. Cl.
CPC ..... *G06Q 30/0244* (2013.01); *G06Q 30/0261* (2013.01); *G06Q 30/0267* (2013.01); *G06Q 30/0275* (2013.01); *H04W 4/021* (2013.01)

(58) Field of Classification Search
CPC .............................. G06Q 30/00; G06Q 30/02
USPC ...................................... 705/14.43; 455/456.1
See application file for complete search history.

(56) References Cited

U.S. PATENT DOCUMENTS

| | | |
|---|---|---|
| 5,227,874 A | 7/1993 | Von Kohorn |
| 5,740,549 A | 4/1998 | Reilly |
| 6,414,602 B2 | 7/2002 | Polyakov |
| 6,519,525 B2 | 2/2003 | Namba |
| 6,647,257 B2 | 11/2003 | Owensby |
| 6,694,132 B1 | 2/2004 | Lausi |
| 7,069,232 B1 | 6/2006 | Fox |
| 7,124,091 B1 | 10/2006 | Khoo |
| 7,636,574 B2 | 12/2009 | Alcatel-Lucent |
| 7,668,832 B2 | 2/2010 | Yeh |

(Continued)

FOREIGN PATENT DOCUMENTS

| | | |
|---|---|---|
| CN | 1290104 | 4/2001 |
| EP | 1271458 | 1/2003 |

(Continued)

*Primary Examiner* — Marilyn G MacAsiano
(74) *Attorney, Agent, or Firm* — Lee & Hayes, P.C.

(57) ABSTRACT

Arrangements are directed to dynamically optimizing the delivery of targeted and/or geographically relevant content. A geographical area can be divided into a virtual grid comprising a plurality of cells. Geographically relevant information can be assigned to the plurality of cells. Responsive to receiving a request to output content to information playback devices within a selected set of the cells, content can be output to an information playback device that is located within a respective one of the selected set of the cells. One or more underperforming cells within the selected set of cells can be identified. The one or more underperforming cells within the selected set of cells can be adjusted without changing the size and shape of the selected cells.

20 Claims, 6 Drawing Sheets

(56) References Cited

U.S. PATENT DOCUMENTS

| | | |
|---|---|---|
| 8,131,585 B2 | 3/2012 | Nicholas |
| 8,538,803 B2 | 9/2013 | Nicholas |
| 8,725,712 B2 | 5/2014 | Arrasvuori |
| 8,892,460 B2 | 11/2014 | Golden |
| 2002/0034954 A1 | 3/2002 | Nohara |
| 2003/0023489 A1 | 1/2003 | McGuire |
| 2003/0115098 A1 | 6/2003 | Kang |
| 2004/0054589 A1 | 3/2004 | Nicholas |
| 2004/0083133 A1 | 4/2004 | Nicholas |
| 2005/0021472 A1 | 1/2005 | Gettman |
| 2005/0148342 A1 | 7/2005 | Sylvain |
| 2005/0197894 A1 | 9/2005 | Fairbanks |
| 2005/0221843 A1 | 10/2005 | Friedman |
| 2005/0256766 A1 | 11/2005 | Garcia |
| 2006/0026067 A1 | 2/2006 | Nicholas |
| 2006/0085318 A1 | 4/2006 | Cohoon |
| 2006/0247971 A1 | 11/2006 | Dresden |
| 2006/0253481 A1 | 11/2006 | Guido |
| 2007/0184820 A1 | 8/2007 | Marshall |
| 2007/0214227 A1 | 9/2007 | Quinn |
| 2007/0239531 A1 | 10/2007 | Beaufays |
| 2007/0250328 A1 | 10/2007 | Dingus |
| 2007/0250383 A1 | 10/2007 | Tollinger |
| 2007/0270132 A1 | 11/2007 | Poosala |
| 2008/0033802 A1 | 2/2008 | McKenna |
| 2008/0062940 A1 | 3/2008 | Othmer |
| 2008/0089288 A1 | 4/2008 | Anschutz |
| 2008/0104634 A1 | 5/2008 | Gajdos |
| 2008/0162037 A1 | 7/2008 | Mahmoud |
| 2008/0215290 A1 | 9/2008 | Zweben |
| 2008/0235731 A1 | 9/2008 | Bryant |
| 2008/0270235 A1 | 10/2008 | Yoon |
| 2008/0294524 A1 | 11/2008 | Badros |
| 2009/0003659 A1 | 1/2009 | Forstall |
| 2009/0006190 A1 | 1/2009 | Ucash |
| 2009/0006211 A1 | 1/2009 | Perry |
| 2010/0312646 A1 | 12/2010 | Gupta |
| 2011/0035458 A1 | 2/2011 | Burnim |
| 2011/0059748 A1* | 3/2011 | Taylor .................... H04W 4/02 455/456.1 |
| 2011/0307167 A1 | 12/2011 | Taschereau |
| 2012/0041817 A1* | 2/2012 | Priyadarshan ..... G06Q 30/0244 705/14.43 |
| 2013/0218710 A1 | 8/2013 | Golden |
| 2014/0236725 A1 | 8/2014 | Golden |

FOREIGN PATENT DOCUMENTS

| | | |
|---|---|---|
| JP | 2002082863 | 3/2002 |
| JP | 2002132820 | 5/2002 |
| JP | 2003337898 | 11/2003 |
| JP | 2007199921 | 8/2007 |
| KR | 20090007447 | 1/2009 |
| WO | 0033163 | 6/2000 |
| WO | 0141526 | 6/2001 |
| WO | 2007109541 | 9/2007 |
| WO | 2008030516 | 3/2008 |
| WO | 2008124537 | 10/2008 |
| WO | 2010101979 | 9/2010 |
| WO | 2014130855 | 8/2014 |

* cited by examiner

SYSTEM AND METHOD FOR OPTIMIZING THE PRESENTATION AND DELIVERY OF CONTENT

CROSS-REFERENCE TO RELATED APPLICATIONS

The present application is a continuation application under 35 U.S.C. § 120 of co-pending International Patent Application Number. PCT/US2014/32914, filed on Apr. 4, 2014, which designated the United States.

FIELD OF THE INVENTION

Embodiments relate, in general, to information communication methods and systems. More particularly, embodiments relate to methods and systems for presenting information associated with discrete geographical areas and/or delivering content based on such information.

BACKGROUND

The last two decades have seen a revolution in how information such as news, advertising, or other content is transmitted to viewers over long distances. With the widespread use of the Internet and information playback devices such as computers, electronic billboards, global positioning devices, and cellular telephones, the volume of information that is provided to individuals is expanding quickly. With so much information available, content providers are grappling with the problem of how to efficiently organize, optimize and/or transmit information to the demographic most likely to use it.

SUMMARY

In one respect, arrangements are directed to a method of dynamically optimizing the delivery of targeted and/or geographically relevant content. A geographical area can be divided into a virtual grid comprising a plurality of cells. Geographically relevant content can be assigned to the plurality of cells. Responsive to receiving a request to output content to information playback devices within a selected set of the cells, content can be output to an information playback device that is located within a respective one of the selected set of the cells. One or more underperforming cells within the selected set of cells can be identified. The one or more underperforming cells within the selected set of cells can be adjusted without changing the size and shape of the selected cells.

In another respect, arrangements are directed to a system for delivering content in a location-specific manner to information playback devices. The system includes a computing system having a processor. The processor is configured to divide a geographical area into a virtual grid comprising a plurality of cells. The processor is further configured to assign geographically relevant content to the plurality of cells. The processor is further configured to, responsive to receiving a request to output content to information playback devices within a selected set of the cells, output content to an information playback device that is located within a respective one of the selected set of the cells. The processor is further configured to identify one or more underperforming cells within the selected set of cells. The processor is further configured to adjust the one or more underperforming cells within the selected set of cells without changing the size and shape of the selected cells.

DETAILED DESCRIPTION

Figure 1:
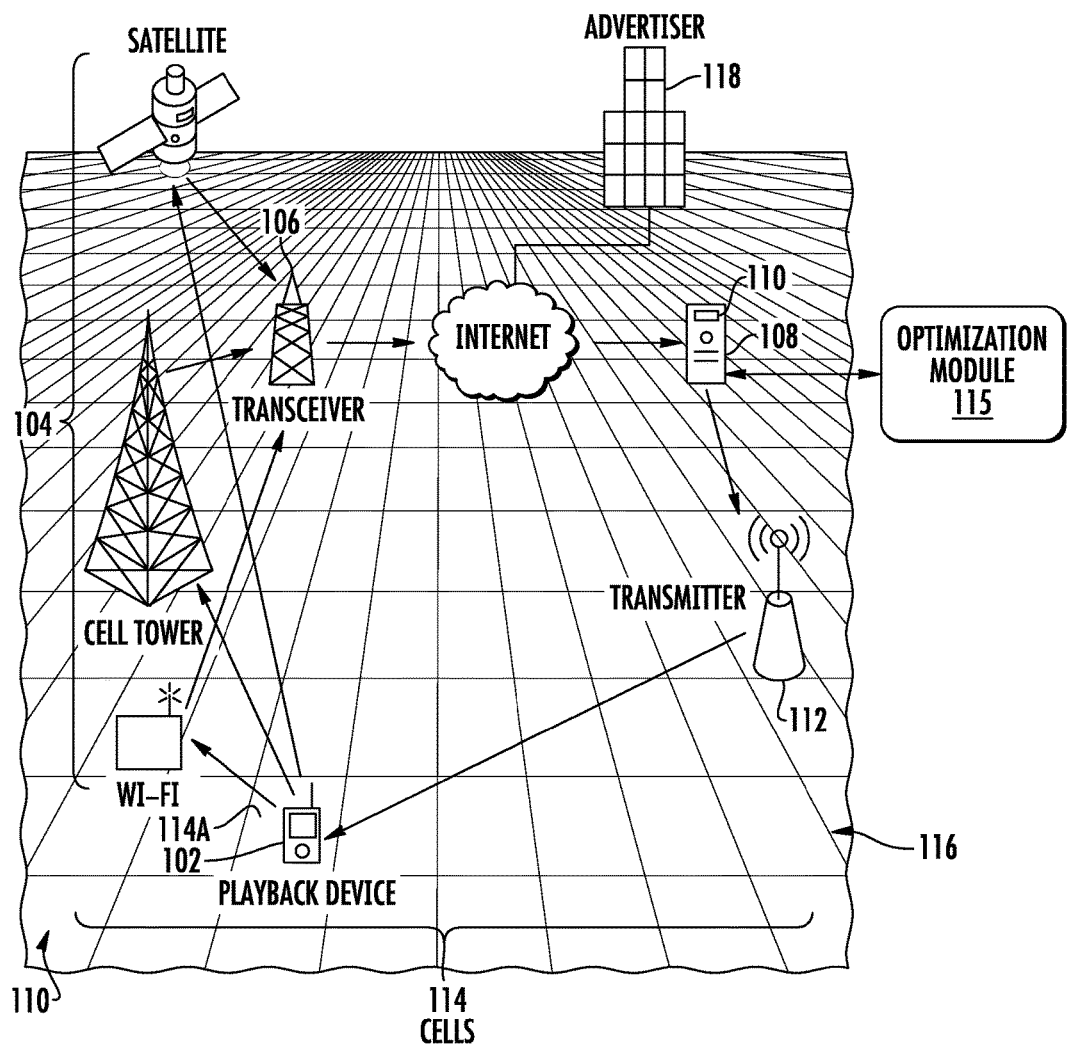
FIG. 1 is an example of a location-based system for delivering targeted content or geo-specific output to information playback devices located in virtual cells of a virtual grid.

Arrangements described herein relate to systems and methods presenting information about discrete geographical areas (e.g. one or more virtual cells defined by a virtual grid) and the use of such information by content providers to facilitate delivery of targeted or geographically relevant content to information playback devices located in one or more particular discrete geographical areas. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The systems and methods can facilitate content providers in communicating content to information playback devices in a location. "Content" includes advertising, data or information in any suitable form, including text, graphics, pinpoints (which identify a certain area on the map that will interact with the grid), photographs, visuals, video and/or audio, hyperlinks and/or interactivity data. Embodiments can be used to communicate any type of content including, without limitation, data, coupons, incentives, offers, promotions, sales, savings, free standing inserts, blogs, microblogs, social interest, public social media data, check-ins, likes, tweets, searches, pinpoints, bar codes, public announcements, emergency alerts, notes, action triggers, listings, first party data, third party data and the like. "Content providers" can include advertisers, marketers, retailers, companies, businesses, organizations, government entities, individuals or other providers of any size.

Embodiments here may be embodied as a system, method or computer program product. An embodiment can include a system having a processor. The processor can be configured to initiate executable operations including any of those shown and/or described herein. Another embodiment is a method of performing one or more operations including any of those shown and described herein. One or more of the operations can be performed by a processor. Another embodiment can include a computer program product for performing one or more operations including any of those shown and/or described herein. The computer program product can include a computer readable storage medium having stored thereon program code that, when executed, configures a processor to perform one or more operations including any of those shown and described herein.

Accordingly, embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects herein may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for embodiments herein may be written in any combination of one or more programming languages, including an object oriented programming language such as Java™ Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments herein are described below with reference to illustrations and/or screenshots of methods, apparatus (systems), and computer program products according to embodiments herein. It will be understood that embodiments shown herein can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the illustrations and/or screenshots.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In an exemplary implementation of a system in accordance with embodiments herein, the system can include at least one processor coupled to one or more memory elements through a system bus or other suitable circuitry or means. As such, system can store program code within the one or more memory elements. The processor can execute the program code accessed from memory elements via system bus or other suitable circuitry or means. In one aspect, for example, system can be implemented as a computer that is suitable for storing and/or executing program code. It should be appreciated, however, that system can be implemented in the form of any system including a processor and memory that is capable of performing the functions and/or operations described within this specification.

The processor may be implemented with one or more general-purpose and/or special-purpose processors. Examples of suitable processors include microprocessors, microcontrollers, DSP processors, and other circuitry that can execute software. The processor can include one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described and/or shown herein.

Memory elements can include one or more physical memory devices such as, for example, local memory and one or more bulk storage devices. Local memory refers to RAM or other non-persistent memory device(s) generally used during actual execution of the program code. Bulk storage device(s) can be implemented as a hard disk drive (HDD), solid state drive (SSD), or other persistent data storage device. System also can include one or more cache memories (not shown) that provide temporary storage of at least some program code in order to reduce the number of times program code must be retrieved from bulk storage device during execution.

Input/output (I/O) devices such as a keyboard, a display, and a pointing device optionally can be coupled to system. The I/O devices can be coupled to system either directly or through intervening I/O controllers. One or more network adapters also can be coupled to system to enable system to become coupled to other systems, computer systems, remote printers, and/or remote storage devices through intervening private or public networks. Modems, cable modems, and Ethernet cards are examples of different types of network adapters that can be used with system.

Embodiments herein can be implemented in a cloud computing environment. Cloud computing can allow access to a shared pool of computing resources (e.g. networks, servers, processors, memory, storage, applications, etc.). It will be understood, however, that embodiments herein are not limited to implementation in a cloud computing environment. Rather, embodiments can be implemented in connection with any other suitable type of computing environment now known or later developed. Embodiments can be implemented on and/or accessed by any suitable device, including, for example, an Internet enabled device and may operate on any compatible web browser.

Systems for Presenting and Selectively Communicating Information

Referring now to FIG. 1, in an exemplary embodiment, the systems and methods for delivery of targeted or geographically relevant content to information playback devices located in discrete geographical areas can be implemented by system 100. The system 100 can facilitate the communication of content to one or more information playback devices 102 in a location-selective manner. The system 100 can include a location tracking system 104 for determining the geographical location of the information playback device 102 (e.g., in terms of latitude and longitude or other suitable geographic coordinate system). The information playback devices 102 can be configured to transmit signals to the location tracking system 104 and receive signals from an external source.

The system 100 can include a transceiver 106 for receiving positional information from the location tracking system 104. The system 100 can further include a server 108 communicatively coupled to the transceiver 106. The term "communicatively coupled" is defined as a state in which two or more components are connected such that communication signals are able to be exchanged between the components on a unidirectional or bidirectional manner, either wirelessly, through a wired connection or a combination of both. The server 108 or other portion of the system 100 can include mapping software and software for creating a virtual grid. A set of information can be stored in a database 110 on the server 108. The system 100 can include a transmitter 112 communicatively coupled to the server 108. The transmitter 112 can be configured to transmit the set of information to the information playback device 102 in a location-selective manner. Each of the foregoing components can be included in multiplicity, e.g., the invention may include one or more computers, information playback devices, location tracking systems, transceivers, different sets of information, and transmitters.

The mapping software and virtual grid creating software may be installed on one or more of the servers 108, which can be communicatively coupled to each other. The mapping software and virtual grid creating software may include high quality earth imagery and geospatial information imagery used to analyze location within cells (granular units) within the grid. One or more information playback devices 102 can be communicatively coupled to the location tracking system 104. The location tracking system 104 can be any system capable of determining the geographical location of an information playback device 102. For example, the location tracking system can be a GPS (e.g., the NAVSTR GPS) or a triangulation system that determines a devices location by the strength of its signals as measured by multiple signal monitors (e.g., cell towers or WI-FI transceivers). Further, the location tracking system 104 can include a global positioning system, a local positioning system or a geolocation system. The positioning system 18 may be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. In some cases, the positional information obtained by the location tracking system 104 might round coordinates to less specific locations or otherwise use fuzzy logic processing to reduce the specificity of the specific positional data. Further, the location tracking system 104 can use Transmission Control Protocol (TCP) and/or a Geographic information system (GIS) and location services.

Alternatively or in addition, the location tracking system 104 can be based on access point geolocation services, such as using the W3C Geolocation Application Programming Interface (API). With such a system, the location of the information playback device 102 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the information playback device 102 is determined will depend on the manner of operation of the particular location tracking system 104 used.

The information playback device 102 can be any suitable device capable of conveying information to a user, transmitting positional information to the location tracking system 104 and receiving information sent from the transmitter 112. In some instances, the information playback device 102 can be configured to communicate via a wireless or wired medium. The information playback device 102 can be portable or stationary (e.g., fixed in place such that it is difficult to move). The information playback device 102 can be any suitable device including, for example, a cellular telephone, a smart phone, a personal digital assistant ("PDA"), a digital reader, a handheld device having wired or wireless connection capability, a computer (e.g., a laptop, tablet, desktop, netbook, notebook, etc.), a portable communication device, a portable computing device, an entertainment device (e.g., a music or video device, or a satellite radio), a global positioning system device, a digital audio player (e.g., MP3 player), fixed digital billboards, wrist watches, an e-book reader, a camera or a game console, transit digital billboards and or devices, Flexible E-Paper Display (EPD), and GPS navigation devices. The electrical device 10 can include any suitable operating system. The information playback device 102 can further include one or more transceivers. The transceiver can be operatively connected to a processor and/or memory of the information playback device 102. The memory and processor of the information playback device 102 can be operatively connected. The term "operatively connected," as used throughout this description, can include direct or indirect connections, including connections without direct physical contact.

Again, the system 100 can include one or more transceivers 106. Any suitable transceiver can be used to access a network, access point, node or other device for the transmission and receipt of data. The transceiver 106 can receive positional information from the location tracking system 104 can take the form of any device capable of receiving a signal from the information playback device 102 and conveying such signal to the server 108. Thus, the transceiver 106 can be a device that includes an antenna, modulates and demodulates signals, and converts such signals from one form to another. The transceiver 106 may operate over wired and/or wireless communication networks. As an example, the transceiver 106 can be configured to communicate data via IEEE 802 wireless communications (e.g., 802.11, 802.16, WPA, WPA2, TDMA, CDMA, WCDMA, GSM, GPRS, UTMS, 3G, 4G, EUTAN, UMB, OFDM, or LTE systems). Additional examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The transceiver can include any wireless technology developed in the future. The transceiver can be any combination of the above noted transceivers. The transceiver 106 can also be configured to communicate over a wireless communication link using a communication protocol such as TCP/IP. In some embodiments, the transceiver 106 can be integrated into the information playback device 102 itself. In such case, the transceiver 106 can communicate directly with the server 108. In addition, hard-wired devices could be used, e.g., a network of roadside billboards each assigned an individual code that can be transmitted.

The server 108 can be in communication with the transceiver 106 and transmitter 112. The server 108 might also include a memory store that stores data corresponding to information (e.g., advertising) which can be transmitted to the information playback device 102, which can be remotely located (e.g., 1, 2, 5, 10, 50, 100, 500 or more km) from the server 108. The information stored in the memory store can include audio and/or visual data.

The server 108 can be configured to transfer a unique identifier (e.g., a cookie) to the information playback devices 102. In one or more arrangements, such activity can be done in response to receiving a command from the optimization module. The information playback devices 102 can transmit HTTP requests, location data, device data and/or other data to the server 108. The server 108 can be configured to receive such requests and/or data from the information playback device 102. The server 108 can be configured to extract data (e.g. location, device and/or other data) from the information playback device 102 in relation to the virtual grid/geo-fence. The data received from the information playback devices 102 can be stored in the memory store. In one or more implementations, data received from the information playback devices 102 can be stored in a profile database. Each user and/or each device can have a unique profile or geo-persona stored in the profile database. A user profile can include any suitable information, including, for example, behavioral traits, purchase history and intent. The consumer profile can be associated with one or more information playback devices. Content can be displayed on one or more information playback devices 102 within one or more of the virtual cells and/or within a geo-fence based on a consumer profile. As an example, the content can include monetization, offers, promotions and/or discounts. The system can track whether a consumer redeems any of the monetization, offers, promotions and/or discounts displayed on the information playback device.

The server 108 can be a computer or set of computers running one or more computer programs such as a mapping program and/or a program for creating a virtual grid that divides a given geographical area into two or more discrete cells. The mapping software can be any program capable of running on the server 108 and processing positional data of the information playback device 102.

The virtual grid software can be any program that can divide a given geographical area into a plurality of discrete (or in some cases overlapping) virtual cells 114. For example, the entire planet Earth, a country, a continent, a state, a city, a township or a region may be overlaid with a virtual grid 116 generated by the software. The virtual cells 114 can have any suitable shape. For example, each of the plurality of cells 114 can be a regular or irregular polygon (e.g., a quadrangle, a square, a rectangle, a rhombus, a triangle, a pentagon, a hexagon, or an octagon) defining an area of greater than or equal to 0.1, 0.5, 1, 2, 3, 4, 5, 6, 7, 8, 9, 10, 15, 25, 50, 75, 100, 200, 300, 400, 500, 1000 or more square km. In other embodiments of the system, each cell of the virtual grid 116 can have an area of about 0.25 km by 0.25 km, 0.5 km by 0.5 km, 0.75 km by 0.75 km, 0.5 km by 1 km, 1 km by 1 km, 1.5 km by 1.5 km, 1 km by 2 km, 2 km by 2 km, 1 km by 3 km, 5 km by 5 km, 10 km by 10 km, 25 km by 25 km, 50 km by 50 km, or 100 km by 100 km. In another embodiment, each of the plurality of cells 114 can be defined by longitude and latitude degrees such as greater than or equal to 0.0001, 0.001, 0.01, 0.1, 1, or 2 degrees longitude by 0.0001, 0.001, 0.01, 0.1, 1, or 2 degrees latitude. The cells 114 may also be non-polygonal, of different sizes and/or shapes, and/or defined by population size (e.g., 1000-2000; 2000-3000; 3000-5000; 5000-10,000; 10,000-25,000; 25,000-50,000, 50,000-100,000; or greater than 100,000 people in each cell). Further, the cells 144 can be adjustable in size.

The transmitter 112 can be communicatively coupled to the server 108 and can be configured to transmit a signal embodying the content to be sent to the information playback device 102. The content can be transmitted to information playback devices 102 that are physically located within the cell or cells 114 of the virtual grid 116 being targeted by an advertiser or other content provider 118. For example, the content provider 118 could choose to deploy targeted or geographically relevant content to information playback devices located in a particular neighborhood or city. In another example, the advertiser could target content or geographically relevant content to cells located in the path of a cruise ship so that the content can be received by information playback devices 102 aboard the cruise ship. In still another example, the information playback device 102 could be a satellite radio, GPS navigation system, or electronic billboard installed in an automobile.

In one embodiment, systems and methods herein can be used to selectively target content to an information playback device located in a particular cell, optionally in an application-specific manner. Upon turning on the information playback device 102 or opening a particular application in the information playback device 102, a signal can be transmitted from the information playback device 102 to the location tracking system 104. If the device 102 is already on, the information playback device 102 can transmit a signal to the location tracking system 104 on a continuous, periodic, irregular or random basis. The location tracking system 104 can convert the signal from the information playback device 102 to data corresponding to the physical location of the information playback device 102. The data corresponding to the physical location of the information playback device 102 can then transmitted to the server 108 (e.g., via a transceiver such as the information playback device 102 itself).

The server 108 can process this data and assign the information playback device 102 to a cell 114*a* in the virtual grid 116. The server 108 can also cause a signal embodying the content to be transmitted to the information playback device 102 which then can convert the signal to an output for presentation on the information playback device 102 to generate the content. For instance, the signal can be converted to audio and/or visual file that is played on the information playback device 102 to generate content. The content may be displayed in a "pop-up" window on the information playback device 102. The content can be displayed as a filmstrip, a slide banner, an adhesion banner, or a full page. The content might also be configured as a file that can be saved in a memory store on the information playback device 102 (e.g., a coupon or incentive that can be saved for use).

In an example, a mobile phone user may enter into a cell 114*a* of the virtual grid 116 where an advertiser or other content provider has submitted a winning bid (e.g., the highest monetary bid or a bid with the highest priority score calculated from a factor other than just a monetary amount). The system provider may offer placement of the information through an existing website such as, for example, Facebook™. When the user accesses the Facebook™ website on the user's mobile phone, the advertiser's information can be displayed, for example, in an information space located at the top of the web page or in another location on the web page. Additional examples are described in U.S. Patent Application Publication No. 2012/0036034, the disclosure of which is incorporated herein by reference in its entirety.

In one or more arrangements, advertisements, monetization, offers, discounts or other content can be displayed on information playback devices 102 within a geo-fence based on the consumer profile in the profile database.

Cell Allocation

The system 100 can provide online features to register for the system's services as well as features that permit content providers to add, manage, and remove their content campaigns. The system 100 may also provide features that allow a content provider to purchase or place bids for content placements in particular cells or for a particular area selected by the content provider. Cells can be allocated to content providers according to various priority and selectivity schemes including those based on bid amounts, fee, cell location, time/date slots, and target categories (e.g., applications in selected areas of interest). Alternatively or in addition to bidding, content providers can purchase content placement in any suitable manner including, for example, a fixed price, cost per millennium (CPM), cost per click (CPC), cost per acquisition (CPA), cost per interaction, flat rate, cost per action, cost per engagement or any other suitable structure. The content provider can select the duration for content placements in particular cells or for a particular area selected by the content provider.

In a typical configuration of a cell-allocation system, a program running on a computer creates a virtual grid overlaying an area such as the world or a country or region such as the United States of America, North America, Asia, South America, or Europe. Content placement in one or more cells within the virtual grid is offered to content providers. Upon acceptance of an offer, the cell allocation system permits the cell or cells to be used by the selected content provider to transmit content to information playback devices within the cell or cells, e.g., in a location- and/or application-specific manner.

As an example, one or more (e.g., 1, 2, 3, 4, 5, 10, 100, 1000 or more) content providers can place at least one bid for content placement rights within a content area. The content area can include one or more cells of the plurality of cells (e.g., a set of cells determined by a radius from a fixed position such as all cells within 10 km of location X). The content area can be defined in any suitable manner. For instance, the content area can be one or more cells of the virtual grid. In the case of a plurality of cells, the plurality of cells can be contiguous, or at least one of the cells may be non-contiguous with the other cells. Alternatively or in addition, the content area can be defined by one or more cells that are within a defined radius from a fixed position. Still alternatively or in addition, the content area can be defined by any suitable regular or irregular shape. In one or more arrangements, a fixed geo-fence can be established around a predefined content area. The term "fixed geo-fence" means an area of one or more cells of a virtual grid with a size, shape and/or distance, etc. that is fixed. That is, the fixed geo-fence is not re-sized during a content campaign, including for collecting results and/or logging of data.

A winning bid (e.g., a highest bid placed by a content provider) can be selected from among the bids submitted by the different content providers. The content of the content provider submitting the winning bid can then be deployed within the bid area. A non-revenue generating developer application advertisement can be transmitted to those cells lacking a paying advertiser. Deployment of content using this method may be accomplished via a software application installed on the wireless device.

Content providers can purchase and/or submit bids in any suitable manner, such as, for example, by communicating with a bidding source (e.g. a server). More particularly, the bidding source can be a programmatic and/or real-time bidding server. The system can be configured to allow a user to select the conditions, (geographic, temporal and/or other condition) associated with the bid. A "content campaign" is a request, instruction, plan or order to deliver content to one or more information playback devices located in predefined content area of a virtual grid. A content campaign can include associated conditions, settings, parameters, configurations and/or requirements. For instance, a content campaign can have an associated budget, overall duration, specific times in which content is delivered, just to name a few possibilities.

Various aspects of the cell allocation system, including bidding and associated user interfaces, are described in U.S. Patent Application Publication No. 2012/0036034, which is incorporated herein by reference in its entirety. The information playback device can communicate with the virtual grid in any suitable manner. In some instances, the information playback device can interface with the one or more elements of the system (e.g. the virtual grid by any suitable application, website and/or other user interface that can allow a user to interact with the virtual grip.

The system 100 can combine large amounts of data from numerous data sources. The data can be assigned to one or more of the virtual cells 114 within the grid 116 based on the relevancy of the data to that cell. Such data can be associated with one or more aspects of the area within the boundaries of the virtual cell. The data can be any suitable type of data. For instance, the data can include contextual, behavioral, predictive, trending, consumer patterns, consumer patterns with reference to a particular geography (including within virtual cells 114), geo-consumer patterns, just to name a few possibilities. The collection and assignment of data to one or more virtual cells within the grid can facilitate advertisement, information and/or content targeting. When an individual virtual cell or a plurality of cells is examined, any data associated therewith can be presented to a user in any suitable manner. The data can be updated and/or optimized on a continuous, periodic, irregular, random or other basis.

The data associated with one or more virtual cells 114 within the grid 116 can be obtained from any suitable source. For instance, the data may be obtained from usage of the system 100 itself. For instance, the data may be location data, user generated information, purchase history and/or registration data. Further, the data can include real time, weather, social media, social networks, news, content, location features, POI, tagging, pictures, blogs, QR codes, hardware, NFC, AI, virtual reality, cameras, augmented reality, census, government records, open source, public records, etc.

The data may be publicly available information. In one embodiment, the data can be obtained from social media websites such as Facebook, Foursquare, Twitter, LinkedIn, etc. Alternatively, the data may be purchased from a third party source, such as from Acxiom, Google, Experian, Factual, and ESRI, just to name a few possibilities. Examples of data from third party sources include intender data, demographic information, and lifestyle preferences. With data associated with the virtual cells within the grid, trends, interest, patterns and opportunities can be identified to facilitate informed geo-targeting decisions and consumer understandings for business of all sizes and sectors in order to deliver more relevant content.

Cell Optimization

The system can further include an optimization module 115, as shown in FIG. 1. The optimization module 115 can process data to optimize the delivery and/or presentation of content to information playback devices within at least a portion of the virtual grid 116 and/or a fixed geo-fence. The optimization module 115 can be configured to process data received from one or more data sources within the virtual grid 116 and/or a fixed geo-fence. The optimization module 115 can reduce or eliminate the wasted impressions that occur in cases in which a selected area of the virtual grid is resized or reshaped to meet the goals of a content campaign. An "impression" is an advertisement or content that is pushed, presented or otherwise delivered to information playback devices 102 in a cell 114 and/or a fixed geo-fence.

The optimization module 115 can be stored on, executed on, accessed by and/or operatively connected to one or more processors or servers. For example, the optimization module 115 can be stored on, accessed by and/or executed on the server 108. Alternatively, the optimization module 115 can be stored on, accessed by and/or executed on a different server. The optimization module 115 can be configured to identify and/or adjust underperforming aspects of a content campaign. For instance, the optimization module 115 can be configured to identify and/or adjust one or more underperforming cells in the virtual grid 114 and/or in a fixed geo-fence. An "underperforming cell" is a cell in the virtual grid or geo-fence that does not meet one or more predetermined criteria. The optimization module 115 can be configured to identify and/or optimize underperforming cells based on one or more types of data, including, for example, information playback device data, location data, impressions, metrics, engagement, performance, and/or other data, just to name a few possibilities. Data can be received, collected, logged and/or recorded, directly or indirectly, by the optimization module 115.

The optimization module 115 can determine one or more optimal solutions from various feasible solutions for any given cell of the virtual grid and/or fixed geo-fence. The optimization module 115 can use any suitable data (e.g., historical results, creative performance, time parameters, location, device, individual traffic sources, connection speed, etc.) collected before and/or after the launch of a content campaign within the virtual grid and/or fixed geo-fence. In some instances, at least a portion of the optimization module 115 can operate through automation and/or machine learning. The optimization module 115 can allow the machine learning to adjust and/or optimize the campaign on a continuous or other suitable basis.

A percentage of automation in relation to machine learning automation (MLA) and optimization can be used. In one or more implementations, the system as a whole or one or more portions thereof can be entirely or substantially entirely automated. However, in some instances, the system as a whole or one or more portions thereof can be configured to allow less than one hundred percent automation, such as upon a client or user request. For instance, a user may wish to have one hundred percent automation with a budget but zero percent re-allocation based on other criteria. In some instances, some portions of the system may not be automated.

The optimization module 115 can make real-time content optimization decisions. As used herein, the term "real time"

means a level of processing responsiveness that a user or system senses as sufficiently immediate for a particular process or determination to be made, or that enables the processor to keep up with some external process.

The optimization module 115 can process information under one or more decision variables and/or one or more constraints. For an incoming impression for a given campaign, the optimization module 115 can valuate the impression and then optimize based on the valuation. The optimized solution identified by the optimization module 115 can result in an adjustment to the content being delivered in a cell of the virtual grid and/or of the geo-fence or an adjustment to some other aspect of the cell or content campaign.

The optimization module 115 can be configured to adjust and/or update the content campaign at any suitable interval. For instance, the optimization module 115 can be configured to update the content campaign continuously, periodically, irregularly or even randomly. The adjusting and/or updating of the content campaign can be performed in any suitable manner. For instance, the adjusting and/or updating of the content campaign can be performed automatically by the system, upon user selection, input or request, or in some other manner.

Figure 2:
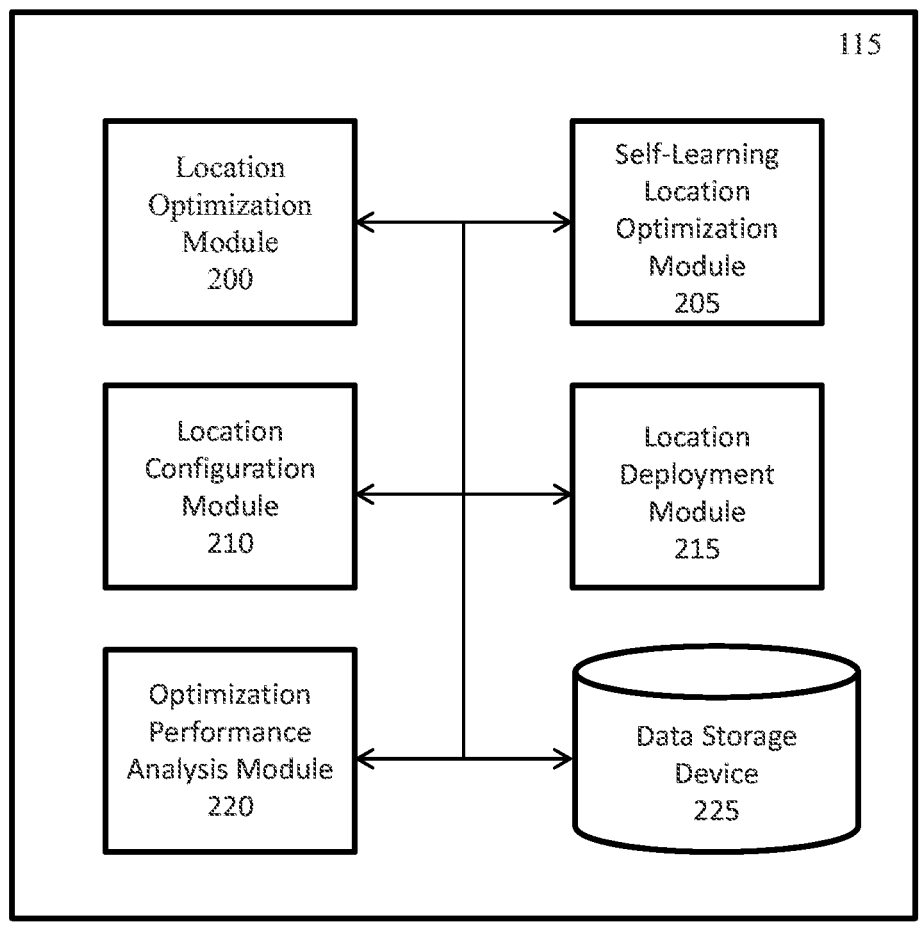
FIG. 2 is an example of an optimization module.

FIG. 2 shows one example of the optimization module 115. Some of the various possible elements of the optimization module 115 shown in FIG. 2 will now be described. It will be understood that it is not necessary for an optimization module 115 to have all of the elements shown in FIG. 2 or described herein. The optimization module 115 can have any combination of the various elements shown in FIG. 2. Further, the various elements shown in connection with the optimization module 115 can be stored and/or executed on the same server or processor, or one or more of the various elements can be stored and/or executed on a different server or processor.

The optimization module 115 can include a location optimization module 200. The optimization module 115 can include a self-learning location optimization module 205. The optimization module 115 can include a location configuration module 210. The optimization module 115 can include a location deployment module 215. The optimization module 115 can include an optimization performance analysis module 220. The output from the real-time optimization performance analysis module 220 can be fed back to the server 108 or other server, system or controller for implementation into the virtual grid 116. In this way, the optimization module 115 can provide an automated, closed-loop, and/or real-time fixed location optimization.

The optimization module 115 can be configured to receive information from any suitable sources, including, for example, the information playback devices 102. The optimization module 115 can include a data storage device 225 to store such information. The data storage device 225 can be located on and/or accessed by the optimization module 115.

The optimization module 115 can collect, receive, log, and/or record any suitable information from the information playback devices 102, one or more websites, one or more applications, or other suitable source. For instance, the optimization module 115 can be configured to directly or indirectly receive location ad requests, results and/or other information from information playback devices 102 via logging results and data. The optimization module 115 can be configured to receive impressions data, performance data and/or other metrics from the information playback devices 102. Impressions can be logged in relation to location and sent to the optimization module 115. As information playback devices 102 interact with applications and/or websites, the applications and/or websites can provide location data and can interact with the server 108 and/or programmatic real-time servers ad networks, exchanges, DSP, SSP, and other components to buy and sell advertisements in real-time.

Again, the optimization module 115 can include a location optimization module 200. The location optimization module 200 can receive and process data to adjust and/or suggest adjustments to one or more aspects of one or more locations (e.g. cells) within the virtual grid and/or a fixed geo-fence based on performance. Examples of data that may be processed by the location optimization module 200 can include one or more of the following: first and/or third party data and/or real-time data, ad unit data results including an location optimization goal, key performance indicators, clients goals, budget goals, optimization goals, campaign results, content results, the campaign locations, any location rules, time, ad results/metrics data. The location optimization module 200 can include an optimization location algorithm to select an optimized location performance.

The location optimization module 200 can be configured to identify underperforming locations in the virtual grid and/or fixed geo-fence. Underperforming cells can be identified in any suitable manner. For instance, data associated with the cells within a fixed geo-fence can be compared to one or more predetermined criteria. Examples of suitable data and/or criteria include: ad unit data results, a location optimization goal (e.g. target only stadiums and/or beaches), budget goal (e.g. daily budget, bulk impression purchase), KPI (key performance indicators) (e.g. campaign life of 5%), time (e.g. noon), ad results/metrics data (e.g. 1% CTR, 5% engagement rate). The optimization module 115 can include a suitable algorithm to determine an optimized location performance.

Underperforming cells can be adjusted and/or suggestions for adjustment can be made. Any suitable type of adjustment can be made to any identified underperforming cells. For instance, underperforming cells can be turned-off, that is, the underperforming cells can be disabled, deactivated, or eliminated so that particular content is no longer delivered to those particular cells. Alternatively or in addition, the underperforming cells can be adjusted by changing the content delivered to those particular cells. For example, a different ad, coupon or other promotion can be delivered to information playback devices in those cells. Additional adjustments can include: creative adjustment, location adjustment, budget adjustment, selecting and de-selecting cells within a fixed geo-fence, A/B testing, removal from location, duplication and/or automation, just to name a few possibilities. For instance, the adjustment can be between a first graphic presenting a first coupon, and a second graphic presenting a second coupon that is different from the first coupon. As an example, a fast food restaurant may initially present a first coupon for one breakfast sandwich. An adjustment can include switching to a second coupon for two breakfast sandwiches.

The optimization module 115 can be configured to adjust and/or update the content campaign one or more cells of the virtual grid and/or of a fixed geo-fence at any suitable interval. For instance, the optimization module 115 can be configured to update the cells continuously, periodically, irregularly or even randomly. The adjusting and/or updating of the cells can be performed in any suitable manner. For instance, the adjusting and/or updating of the cells can be performed automatically by the system, upon user selection, input or request, or in some other manner. Any adjustments made by the location optimization module 200 can be logged and/or stored.

The location optimization module 200 can process data in real-time. The location optimization module 200 can receive and/or process any suitable data, including, for example, ad unit data, optimization goal data, budget goal data, key performance indicator data, advertisement results data, advertisement metrics data, location data, rule data, time data and/or one or more optimization location algorithm performance and selection data. The location optimization module 200 can include and/or access one or more data storage devices where such data can be stored. Such data can be first party data and/or third party data.

An optimization location algorithm can be used to identify and/or select optimized locations within the geo-fence/grid. Any suitable algorithm can be used. The algorithm can be used to increase performance by adjusting or suggesting adjustments to cells within the virtual grid and/or a fixed geo-fence. The algorithm can include automation and machine learning. The algorithm can look for the best solution from all feasible solutions in that cell of the grid. For each incoming impression that needs to be optimized to a location, one or more decision variables and/or one or more constraints can be added. For an incoming impression, for each campaign, the module can valuates it and then optimize on it. The best optimized solution can gets the ad delivered in that cell of the virtual grid and/or geo-fence. A mathematical model of the state of the system (the optimization of fixed geo-fences) can be utilized to produce a control signal to implement local adjustments.

The output of the optimization location algorithm can be compared with a predefined goal (e.g. an ad unit optimization goal, such as increase performance by 10%) and/or a predefined budget to determine whether the location under consideration is optimized within those parameters. In one or more implementations, feedback from the output of the executed optimization location algorithm can be provided as an input back into the optimization location algorithm and/or to one or more other optimization algorithms. Based upon the feedback, the next iterative step of the optimization location algorithm can be determined. One or more additional iterations of the optimization location algorithm can be performed to converge upon one or more optimized locations. The location of the ad unit can be modified to implement the optimum fixed targeting location of the deployed ad unit.

The location optimization module 200 can use one or more rule engines to automate the optimization process. Within a fixed geo-fence, the system can monitor the performance and cost of various results from targeted locations and serving assets to the best location according to a certain measure.

The self-learning location optimization module 205 can receive and/or process data to identify optimal results within one or more cells of the virtual grid and/or within a fixed geo-fence. The self-learning location optimization module 205 can be receiving and/or processing data continuously, periodically, irregularly or even randomly. The self-learning location optimization module 205 can include any suitable algorithm. Once the self-learning location optimization module 205 can determine an optimal result, such information can be sent to any suitable portion of the optimization module 115 and/or the system. For instance, such information can be sent to the location configuration module 210, the location deployment module 215 and/or the optimization performance analysis module 220.

The self-learning location optimization module 205 can receive and/or process any suitable data. Examples of suitable data include ad unit data including, for example, website/app served, engagement metrics (click-to-_____, click to return (CTR), click to call, etc.), connectivity, or information about the location itself comprising at least one of node performance metrics, location performance metrics, location, device, individual traffic source, connection speed and/or ad delivery savings. Alternatively or in addition, the algorithm(s) can also use prior success from said advertisement or other advertisers in the fixed location in a similar vertical category. Additional examples of suitable data include historical results, categorical notes, creative performance, time parameters, location, device, individual traffic sources, connection speed, and campaign propensity algorithm performance and selection. Yet another of suitable data includes consumer propensity for content/product/advertising categories in relation to fixed locations. The above examples of suitable data may be collected before and/or after the initiation of a content campaign within the virtual grid. The self-learning location optimization module 205 can include one or more algorithms to process such data.

The self-learning location optimization module 205 can process data in real-time. The self-learning location optimization module 205 can also include machine learning automation (MLA). The MLA can be based on prior success from an advertisement or other advertisers in the fixed location in similar vertical/category. The MLA can adjust and/or optimize a campaign continuously, periodically, irregularly or even randomly. The self-learning location optimization module 205 can apply MLA based on various data, including the various examples of suitable data noted above. The MLA can use a propensity model to assist in the increase of performance and location selection(s). In some implementations, the machine learning can continuously adjust and/or optimize the content campaign.

The self-learning location optimization module 205 can be configured to log, record and/or model adjustments that were successful, adjustments that were not successful, predict or determine what adjustments may be successful in the future, and/or make adjustments that yield better performance. Such processing can be performed while continuing to record and/or log data.

The location configuration module 210 can process data to select one or more cells and/or to automatically set-up a configuration for one or more of the cells. The configuration of a cell can include, for example, delivery time, ad format, ad balancing, yield configuration, and/or ad monitoring. Ad balancing occurs when there is more than one advertisement or other content and a determination can be made as to how the different advertisements or content is spread out among different cells. Ad balancing can be configured to improve ad server availability and/or lower ad media delivery latency. Yield configuration can allow the ability to serve advertisements at any given moment based on analytics and data.

The location configuration module 210 can be configured to optimize the performance of a targeted location. One or more targeted locations can be configured to log ad results and/or other data via websites, applications and/or other suitable interfaces. Such logged ad results and/or other data can be received by a server and processed to provide location optimization to a fixed geo-fence. Determining the optimal fixed location for the ad unit can include processing the logged ad results and/or other data to identify a location within a geo-fence and/or virtual grid that yields the highest performance for the ad unit and/or the elimination of lowest performing ad unit.

The location configuration module 210 can receive an output from the self-learning location optimization module 205 for improving the performance of a content campaign. The location configuration module 210 can process the output and/or other data in real-time to select locations within fixed geo-fence and/or virtual grid, configure locations within fixed geo-fence and/or virtual grid, configure content, configure yield, configure advertisement/content balancing, configure advertisement/content monitoring, and/or configure timing, just to name a few possibilities. The location configuration module 210 can be configured to suggest adjustments and/or configurations. Alternatively or in addition, the location configuration module 210 can be configured to automatically implement adjustments and/or configurations. Any adjustments and/or configurations made by the location optimization module 200 can be logged and/or stored.

The location configuration module 210 can process data in real-time. The location configuration module 210 can receive and/or process any suitable data, including, for example, location selection data, location configuration data, ad configuration data, yield configuration data, ad balancing configuration data, ad monitoring configuration data, timing configuration data, algorithm adjustment data and/or real-time algorithm adjustment data. The location configuration module 210 can include and/or access one or more data storage devices (e.g. data storage device 225) where such data can be stored.

The performance of a targeted location can be optimized in any suitable manner. For instance, one or more targeted locations can be configured to log ad results via websites or applications. One or more servers can be configured to receive the location requests/results. The one or more servers can provide location optimization to a geo-fence. Determining an optimal fixed location for an ad unit can include using the results and finding a location within the distributed geo-fence/grid that yields the highest performance for the ad unit. Alternatively or in addition, determining an optimal fixed location for an ad unit can include elimination of lowest performing ad unit.

The location deployment module 215 can process data to communicate with ad exchanges, real-time bid partners, content providers, or other systems, devices, components, servers, and/or platforms in which content/advertisements can be bid on or purchased for delivery to information playback devices in the virtual grid. Budgets and bids in relation to optimized location suggestions from the system can be placed in the real time bidding environment.

The location deployment module 215 can process data in real-time. The location deployment module 215 can receive and/or process any suitable data, including, for example, one or more ad units deployment, one or more location(s), one or more RTB communications, and/or one or more ad monitoring configurations. The optimum location solution deployment module 215 can include and/or access one or more data storage devices (e.g. data storage device 225) where such data can be stored.

The optimization performance analysis module 220 can process data to run simulations of advertisements in fixed geo-fence to predict, forecast, and/or analyze current and future results. The optimization performance analysis module 220 can monitor a location content campaign. The optimization performance analysis module 220 can log and/or record results, metrics, performance, engagement, and/or other data. The optimization performance analysis module 220 can analyze such data. Such logging, recording and/or analyzing can be performed in real-time. In some instances, the optimization performance analysis module 220 can report to the real-time location optimization module 200, the location configuration module 210 and/or the location deployment module 215, so that at least a portion of the optimization process can be repeated in one or more further iterations for further improvement. The optimization performance analysis module 220 can send an optimized response to a server for implementation in the content campaign.

The optimization performance analysis module 220 can process data in substantially real-time. The optimization performance analysis module 220 can receive and/or process any suitable data, including, for example, ad analysis data, location analysis data, engagement analysis data, performance analysis data and/or real-time algorithm adjustment configuration data. The optimization performance analysis module 220 can include and/or access one or more data storage devices (e.g. data storage device 225) where such data can be stored.

Arrangements herein can include analyzing and/or estimating fixed location data within a fixed geo-fence. Arrangements herein can also include running simulations of advertisements in a fixed geo-fence. Such activity can be used to predict, forecast, and/or analyze current and future results.

Arrangements can be configured to allow for intermediary location optimization in which the system can scale its processing capacity by scaling up and down the cloud based computing infrastructure in response to some benchmark (e.g., CTR, impressions and/or other metrics that increase ad demand). The intermediary location optimization can be cloud-based and can be configured to operate in a private cloud, a public cloud or a hybrid cloud computing infrastructure. In a cloud-based system, the intermediary location optimization can operate in different geographic locations around the world. When the intermediary location optimization is cloud based, there system can scale its processing capacity by scaling up and down the cloud based computing infrastructure in response to web traffic processing demand.

Arrangements herein can use real time bidding/programmatic media buying intermediaries in real-time that can correlate to fixed location results and data for optimized ad units for ad deployment in optimized locations. Such optimized locations can include, for example, one or more servers, exchanges, and/or platforms, just to name a few possibilities. Further, arrangements herein can use real-time bidding and/or programmatic media buying independent servers in real-time that can correlate to fixed location results and data for optimized ad units for ad deployment in optimized locations. Examples of optimized locations include but are not limited to: one or more servers, clouds, exchanges and/or platforms.

Figure 3:
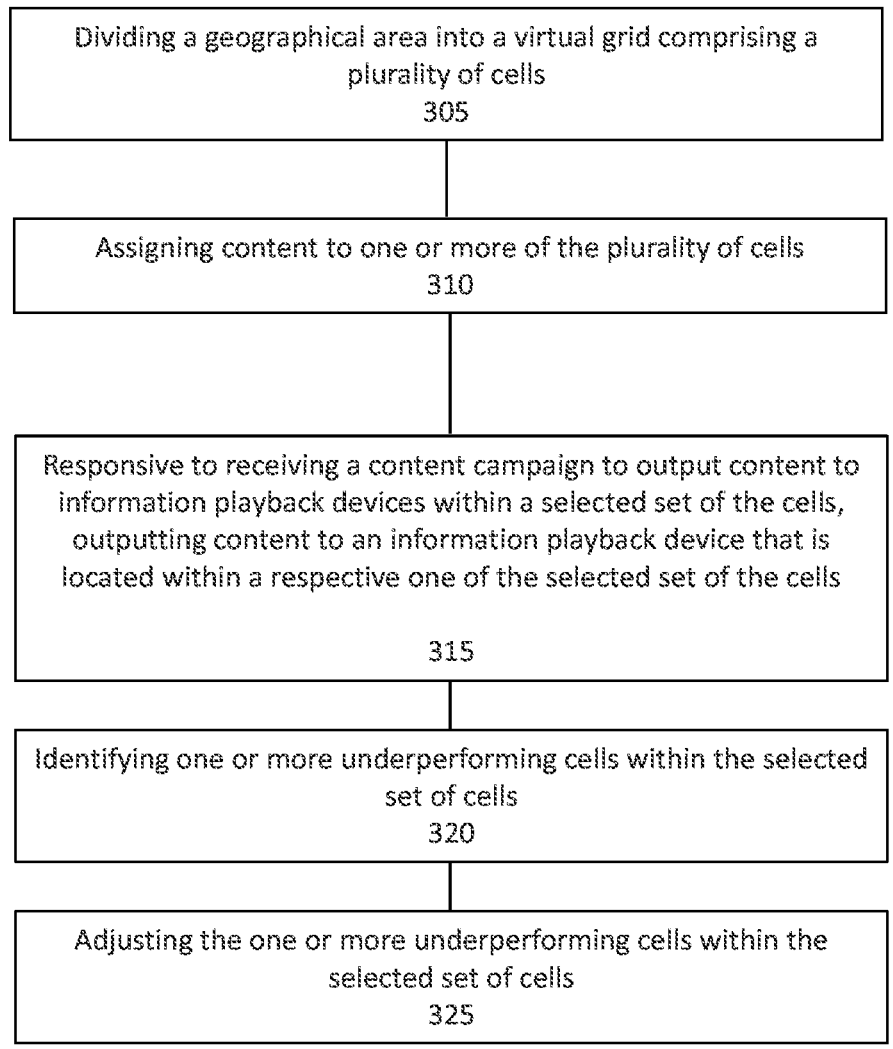
FIG. 3 is an example of a method of optimizing the delivery of targeted content or geo-specific output to information playback devices located in virtual cells of a virtual grid.

Now that various aspects of the system for optimizing the presentation and/or delivery of targeted content or geo-specific output to information playback devices located in virtual cells of a virtual grid have been presented, one manner of operating the system will now be described. Referring to FIG. 3, an example of a method 300 of optimizing the delivery of targeted content or geo-specific output to information playback devices located in virtual cells of a virtual grid is shown. Various possible steps of method 300 will now be described. The method 300 illustrated in FIG. 3 may be applicable to the embodiments described herein in relation to FIGS. 1-2 and 4-6, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order, either. Indeed, some of the steps may be performed in a different order than what is shown and/or at least some of the steps shown can occur simultaneously.

In block 305, a geographical area can be divided into a virtual grid comprising a plurality of cells. In block 310, content, such as targeted content and/or geographically relevant information, can be assigned to one or more of the plurality of cells. In block 315, responsive to receiving a content campaign to output content to information playback devices within a selected set of the cells, content is output to an information playback device that is located within a respective one of the selected set of the cells.

In block 320, one or more underperforming cells within the selected set of cells can be identified. Underperforming cells can be identified in any suitable manner relative to one or more criterion.

In block 325, the one or more underperforming cells within the selected set of cells can be adjusting. In one or more implementation, adjusting the one or more underperforming cells within the selected set of cells can include disabling the one or more underperforming cells. In one or more implementations, adjusting the one or more underperforming cells within the selected set of cells can include altering the content output to the one or more underperforming cells. As an example, the content itself can be changed. As an alternative or additional example, the shape and/or format of the content can be varied. In this way, arrangements can cause ads to be presented on information playback devices in one or more locations to fit advertising/informational optimal results.

The adjusting of the underperforming cells can occur for the remainder of the information/advertising campaign. Alternatively, the adjusting can be implemented for a predefined period of time that is less than the remainder of the information/advertising campaign. The adjusting can occur repeatedly over time, as the system can continue to collect information with respect to the underperforming cells. In some instances, the adjusting can include undoing a prior adjustment. For instance, a previously disabled cell can be re-enabled.

Figure 4:
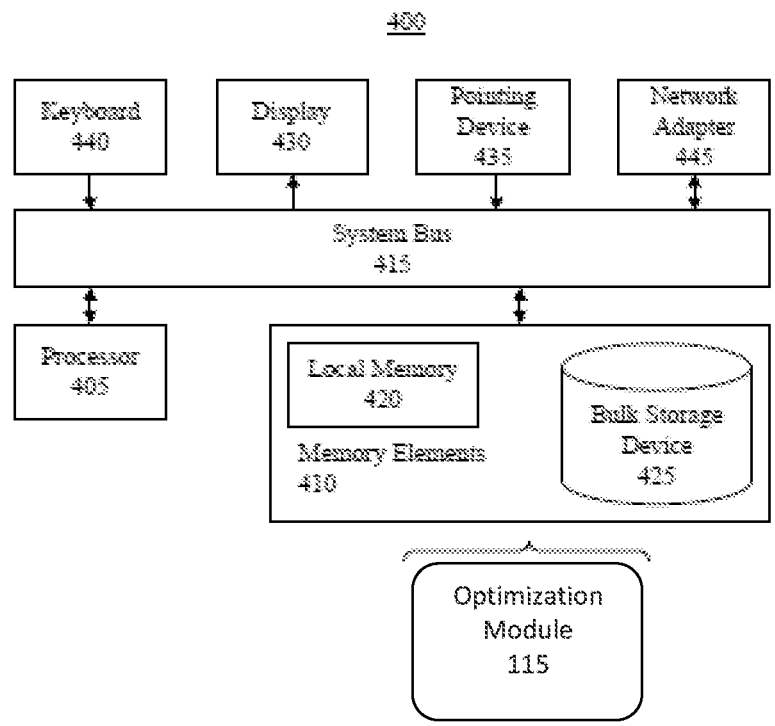
FIG. 4 is a block diagram illustrating a system for delivering targeted content or geo-specific output to information playback devices located in virtual cells of a virtual grid.
Figure 5:
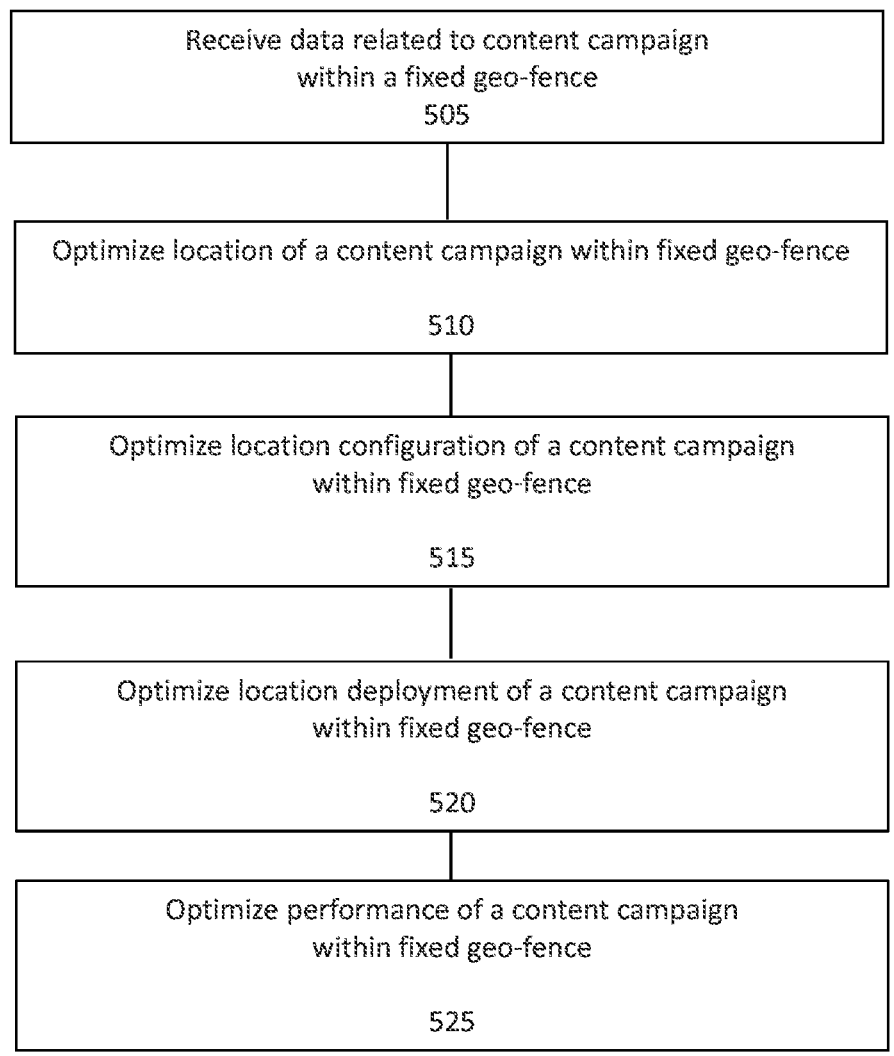
FIG. 5 is an example of a system for optimizing the delivery of targeted content or geo-specific output to information playback devices located in virtual cells of a virtual grid.

Referring to FIG. 5, an example of a method 500 of dynamically optimizing the delivery of targeted and/or geographically relevant content to information playback devices within one or more virtual cells of a grid is shown. Various possible steps of method 500 will now be described. The method 500 illustrated in FIG. 5 may be applicable to the embodiments described herein in relation to FIGS. 1-4 and 6, but it is understood that the method 500 can be carried out with other suitable systems and arrangements. Moreover, the method 500 may include other steps that are not shown here, and in fact, the method 500 is not limited to including every step shown in FIG. 5. The steps that are illustrated here as part of the method 500 are not limited to this particular chronological order, either. Indeed, some of the steps may be performed in a different order than what is shown and/or at least some of the steps shown can occur simultaneously.

In block 505, data related to a content campaign within a fixed geo-fence can be received. In one or more implementations, the data can be received, directly or indirectly, by the optimization module 115 from one or more suitable sources, including from information playback devices 102 within the fixed geo-fence. As described above, the data can be any suitable data related to an information playback device within the virtual grid, including, for example, the use of a device, impressions, performance, metrics, etc. Block 505 can be performed in real-time or on any suitable basis. In some implementations, receiving data in block 505 can continue even while the optimizing in one or more of the other blocks 510, 515, 520, 525 is being performed.

At block 510, at least a portion of the data received in block 505 and/or other data can be processed to optimize the location of a content campaign within the fixed geo-fence. In one or more implementations, such optimizing can be performed by the location optimization module 200. The optimization in block 510 can include the application of machine learning automation, such as through the use of the self-learning location optimization module 205 and/or self-learning optimization data stored in the data storage device 225. The optimizing in block 510 can be performed in real-time.

At block 515, the location configuration of a content campaign within a fixed geo-fence can be optimized. In one or more implementations, such optimizing can be performed by the location configuration module 210. In one or more arrangements, such optimizing can include receiving and/or processing at least a portion of the data from the optimizing in block 510 and/or the data received in block 505. For instance, the location configuration module 210 can be configured to receive and/or process an output from the location optimization module 200. The optimizing in block 515 can be performed in real-time.

At block 520, the location deployment of a content campaign within a fixed geo-fence can be optimized. In one or more implementations, such optimizing can be performed by the location deployment module 215. In one or more arrangements, such optimizing can include receiving and/or processing data from the optimizing in block 515, block 510, the data received in block 505, and/or other data. For instance, the location deployment module 215 can be configured to receive and/or process an output from the location configuration module 210. The optimizing in block 520 can be performed in real-time.

At block 525, the performance of a content campaign within a fixed geo-fence can be optimized. In one or more implementations, such optimizing can be performed by the optimization performance analysis module 220. In one or more arrangements, such optimizing can include receiving and/or processing at least a portion of the data from the optimizing in block 520, block 515, block 510, the data received in block 505 and/or other data. For instance, the optimization performance analysis module 220 can be configured to receive and/or process an output from the location deployment module 215, the location configuration module 210, and/or the location optimization module 210. The optimizing in block 525 can be performed in real-time.

In some implementations, the method 500 can return to block 510 to include an output from block 525. In such case, at least a portion of the data from the optimizing in block 525, along with the data received in block 505 and/or other data, can be processed to further optimize the location of a content campaign within the fixed geo-fence. Blocks 510, 515, 520, 525 can be repeated, and may repeat in one or more further iterations until an optimized result is converged upon. The method 500 can result in an output being sent to a server or other component, system or device to implement adjustments to a content campaign within a fixed geo-fence.

Figure 6:
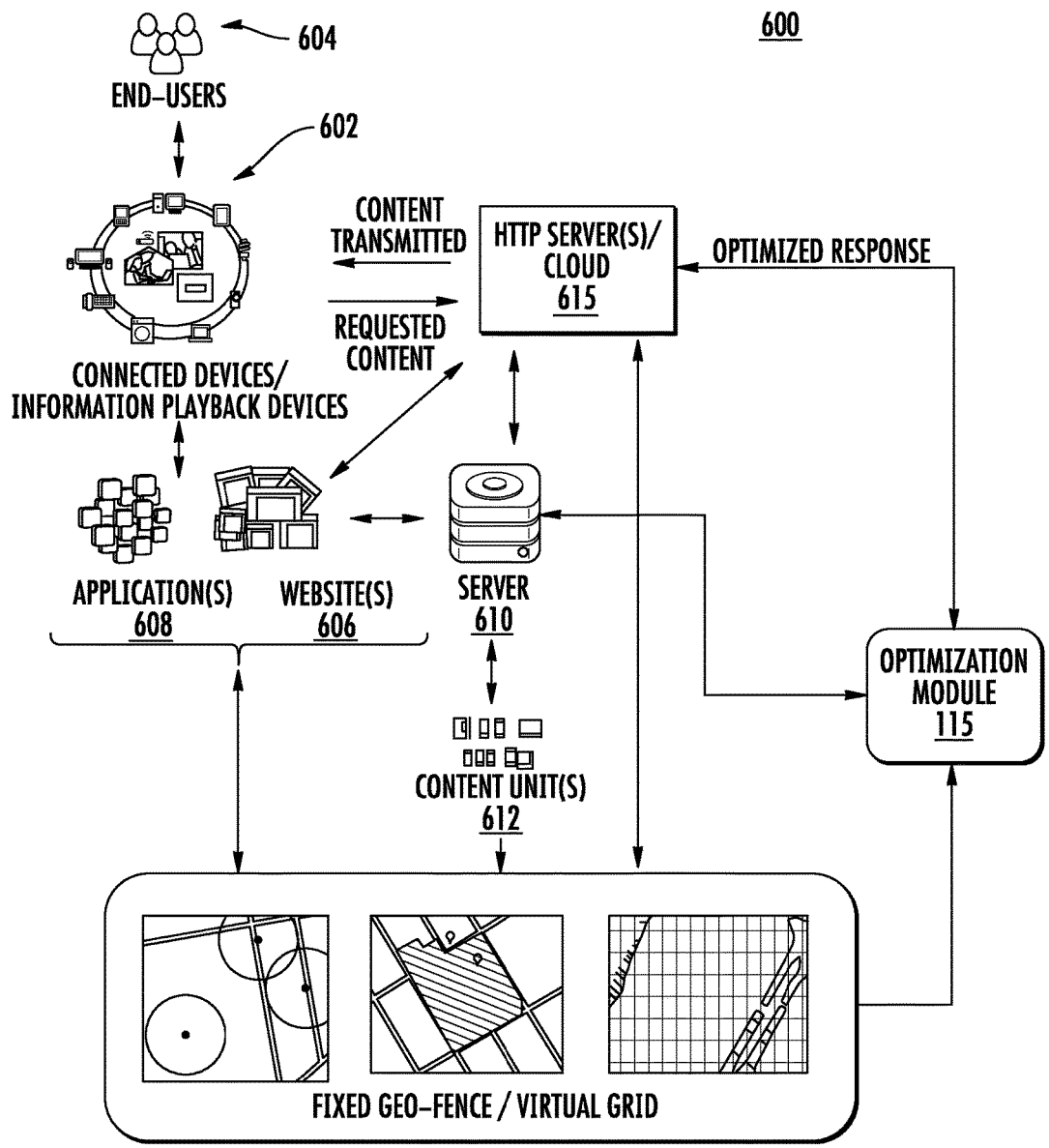
FIG. 6 is an example of a method of optimizing the delivery of targeted content or geo-specific output to information playback devices located in virtual cells of a virtual grid.

An example of a system 600 according to arrangements herein is shown in FIG. 6. The system 600 can include one or more connected devices 602, which include any of the above noted information playback devices 102. The connected devices 602 can allow end user 604 (e.g. person(s)) to access, use and/or interface with one or more websites 606, applications 608 or other user interfaces. An end user 604 can be a consumer using or interfacing with an information playback device 102 within the virtual grid and/or a content provider.

The system 600 can include a programmatic/bidding server 610. Again, content providers can purchase and/or submit bids in any suitable manner, such as, for example, by communicating with a bidding source (e.g. the bidding server 610). The content units 612 from the server 610 can be sent to the virtual grid, one or more cells in the grid and/or a fixed geo-fence.

Any suitable data from the virtual grid, one or more cells in the grid and/or a fixed geo-fence, the application(s) 608, the website(s) 606, the server 610, the connected devices 602, and/or other sources can be received by or otherwise collected by the optimization module 115. The optimization module 115 can output data, commands, instructions or other information to any suitable system(s), component(s) or item(s) for adjusting the delivery of content to the connected devices 602. For instance, optimization module 115 can output data, commands, instructions or other information to one or more servers 615 (e.g. HTTP server(s) or cloud-based server(s)). It should be noted that while FIG. 6 shows two different servers 610, 615, it will be understood that arrangements are not limited to two servers. For instance, in some arrangements, there can be more than two servers. In some arrangements, the servers 610, 615 can be a single server.

The various components of system 600 can be communicatively linked through one or more communication networks. As used herein, the term "communicatively linked" can include direct or indirect connections through a communication channel or pathway or another component or system. A "communication network" means one or more components designed to transmit and/or receive information from one source to another.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short or long range. For example, in terms of short range wireless networks, the communication network can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network can include a mobile, cellular, and or satellite-based wireless network and support voice, video, text, and/or any combination thereof. Examples of long range wireless networks can include GSM, TDMA, CDMA, WCDMA networks or the like. The communication network 125 can include wired communication links and/or wireless communication links. The communication network 1 can include any combination of the above networks and/or other types of networks. The network can include one or more routers, switches, access points, wireless access points, and/or the like.

The one or more servers 610, 615 can be implemented as any suitable communication hub or server capable of performing the various functions described herein. The servers 610, 615 can include suitable operational software for performing the various functions described herein.

Some examples of the use of systems and methods described herein will now be presented. These examples are given to facilitate the description but are not intended to be limiting.

As a first example, Brand X can be running location-based advertising campaign in the virtual grid 114. Thus, content can be delivered to devices (e.g. connected devices 602 and/or information playback devices 102) based on the location of a device within the virtual grid. At any point during the campaign, for the entire campaign or any portion thereof, the optimization module 115 can be applied. End-users 604 on connected devices 602 can interact with application(s) 608, website(s) 606, and/or other interfaces. The application(s) 608, website(s), and/or the connected device(s) 602 can request content (e.g. an advertisement) from the server 615 and can transmit the location of the device within the fixed geo-fence or virtual grid. Content can be transmitted to the requesting application(s) 608, website(s) 606 being accessed by and/or executed on the connected device(s) 602 in the location within the fixed geo-fence or virtual grid. Data (e.g. impressions, metrics, engagement, performance, etc.) can be received, collected, logged and/or recorded, directly or indirectly, by the optimization module 115.

The location optimization module 200 can process data in real-time, such as optimization and budget goals, KPI's, ad results, location rules, etc. The location optimization module 200 can adjust locations (e.g. cells) in the grid based on performance. For instance, Brand X may desire a 1.0% click to return minimum and may not want to allocate any budget on cells that are not yielding at least 1,000 impressions. The location optimization module 200 can be configured to identify cells in the grid or fixed geo-fence that are not meeting one or both of these criteria. Cells that are not meeting one or both of these criteria can be adjusted, such as by deselecting, deactivating, disabling and/or eliminating those cells. Any adjustments made by the location optimization module 200 can be logged and/or stored.

The self-learning location optimization module 205 can apply machine learning automation based on various data, including historical, categorical results, creative performance, location, device, traffic source, connection speed, etc. The machine learning automation can use a propensity model to assist in the increase of performance and location selection(s). For instance, after processing by the location optimization module 200, the Brand X campaign may now be performing above the 1.0% click to return rate and cells that have logged under 1000 impressions have been deselected, deactivated, disabled and/or eliminated. The machine learning automation can be configured to log, record and/or model adjustments that were successful, adjustments that were not successful, predict or determine what adjustments may be successful in the future, and/or make adjustments that yield better performance. Such processing can be performed while continuing to record and/or log data.

The location configuration module 210 can receive the suggested adjustments from the self-learning location optimization module 205 for improving the performance of the Brand X ad campaign. The location configuration module 210 can process the suggested adjustments and/or other data in real-time to select locations within fixed geo-fence and/or virtual grid, configure locations within fixed geo-fence and/or virtual grid, configure advertisements/content, configure yield, configure advertisement/content balancing, configure advertisement/content monitoring, and/or configure timing, just to name a few possibilities. The location configuration module 210 can be configured to suggest adjustments and/or configurations. Alternatively or in addition, the location configuration module 210 can be configured to automatically implement adjustments and/or configurations. Any adjustments and/or configurations made by the location optimization module 200 can be logged and/or stored.

The location deployment module 215 can receive the suggested adjustments and/or configurations from the location configuration module 210. The location deployment module 215 can process the suggested adjustments and/or configurations in real-time. The location deployment module 215 can deploy a campaign (e.g. the Brand X campaign) by deploying to real-time bid partners to bid on content placement to the adjusted locations. Monitoring of the system continues as well as the recording and/or logging of suitable data.

The optimization performance analysis module 220 can be configured to monitor the Brand X campaign, the optimized locations, and continually analyzes location, ad performance, metrics, engagement, etc. in real-time. The optimization performance analysis module 220 can send an optimized response to the server 615 for implementation. In some implementations, an output from the optimization performance analysis module 220 can be sent to the location optimization module 200, the location configuration module 210 and/or the location deployment module 215, and at least a portion of the optimization process can be repeated in one or more further iterations.

Another example will now be provided. In this example, Brand Y can be running a location-based advertising campaign in the virtual grid 114. End-users 604 on connected devices 602 can interact with application(s) 608, website(s) 606, etc. The application(s) 608, website(s), and/or the connected device(s) 602 can request content (e.g. an advertisement) from the server 615 and can transmit the location of the device within the fixed geo-fence and/or virtual grid. Content can be transmitted to the requesting application(s) 608, website(s) 606 being accessed by and/or executed on the connected device(s) 602 in the location within the fixed geo-fence and/or virtual grid. Data (e.g. impressions, metrics, engagement, performance, etc.) can be received, collected, logged and/or recorded, directly or indirectly, by the optimization module 115.

The location optimization module 200 can process data in real-time, such as optimization and budget goals, KPI's, ad results, location rules, etc. The location optimization module 200 can adjust locations (e.g. cells) in the grid based on performance. For instance, Brand Y may desire to target the entire city of San Francisco and may decide to identify the particular areas within City A in which consumers are engaging in a Brand Y advertisement based on the action of click-to-call. For instance, Brand Y may desire cells that yield an engagement rate of 5 or more click-to-calls. The location optimization module 200 can be configured to identify any cells in the virtual grid or fixed geo-fence that are not meeting the selected click-to-call engagement rate. Any cells identified as not meeting the criteria can be adjusted, such as by deselecting, deactivating, disabling and/or eliminating those cells. Budget can be reallocated to the cells that are meeting the selected click-to-call engagement rate. Any adjustments made by the location optimization module 200 can be logged and/or stored.

The self-learning location optimization module 205 can apply machine learning automation based on various data, including historical, categorical results, creative performance, location, device, traffic source, connection speed, etc. The machine learning automation can use a propensity model to assist in the increase of performance and location selection(s). For instance, after processing by the location optimization module 200, the Brand Y campaign may now be performing above greater than 5 click-to-call engagement rate and cells that have logged under the 5 click-to-call engagement rate have been deselected, deactivated, disabled and/or eliminated. The machine learning automation can be configured to log, record and/or model adjustments that were successful, adjustments that were not successful, predict or determine what adjustments may be successful in the future, and/or make adjustments that yield better performance. Such processing can be performed while continuing to record and/or log data.

The location configuration module 210 can receive the suggested adjustments from the self-learning location optimization module 205 for improving the performance of the Brand Y ad campaign. The location configuration module 210 can process the suggested adjustments and/or other data in real-time to select locations within fixed geo-fence and/or virtual grid, configure locations within fixed geo-fence and/or virtual grid, configure advertisements/content, configure yield, configure advertisement/content balancing, configure advertisement/content monitoring, and/or configure timing, just to name a few possibilities. The location configuration module 210 can be configured to suggest adjustments and/or configurations. Alternatively or in addition, the location configuration module 210 can be configured to automatically implement adjustments and/or configurations. Any adjustments and/or configurations made by the location optimization module 200 can be logged and/or stored.

The location deployment module 215 can receive the suggested adjustments and/or configurations from the location configuration module 210. The location deployment module 215 can process the suggested adjustments and/or configurations in real-time. The location deployment module 215 can deploy a campaign (e.g. the Brand Y campaign) by deploying to real-time bid partners to bid on content placement to the adjusted locations. Monitoring of the system continues as well as the recording and/or logging of suitable data.

The optimization performance analysis module 220 can be configured to monitor the Brand Y campaign, the optimized locations, and continually analyzes location, ad performance, metrics, engagement, etc. in real-time. The optimization performance analysis module 220 can send an optimized response to the server 615 for implementation. In some implementations, an output from the optimization performance analysis module 220 can be sent to the location optimization module 200, the location configuration module 210 and/or the location deployment module 215, and at least a portion of the optimization process can be repeated in one or more further iterations.

It will be appreciated that arrangements described herein can provide numerous benefits. For instance, the arrangements described herein can allow a content provider to specifically target desired consumers with high cost efficiency and flexibility. Further, the arrangements herein can enhance location performance to the following but not limited to: advertisements, content, blogs, social interest, public social media data, check-ins, likes, tweets, likes, photos, search, first party data and third party data. On addition, the arrangements described herein can minimize the hit or miss approach of traditional geo-fencing, in which optimization is performed by increasing or decreasing the size of the geo-fence. Instead, arrangements herein can allow for individual cells within a fixed geo-fence to be treated (e.g. underperforming cells can be removed or altered). In some instances, underperforming cells can account for up to 60% of the content delivered. Further, arrangements herein can increase CTRs and post-click conversions.

FIG. 4 is a block diagram illustrating an example of a data processing system 400. System 400 can include at least one processor (e.g., a central processing unit) 405 coupled to memory elements 410 through a system bus 415 or other suitable circuitry. As such, system 400 can store program code within memory elements 410. Processor 405 executes the program code accessed from memory elements 410 via system bus 415 or the other suitable circuitry.

In one aspect, system 400 is implemented as a computer or other programmable data processing apparatus that is suitable for storing and/or executing program code. It should be appreciated, however, that system 400 can be implemented in the form of any system including a processor and memory that is capable of performing and/or initiating the functions and/or operations described within this specification. Further, system 400 can be implemented in any of a variety of different form factors including, but not limited to, a portable device such as a mobile communication device, a tablet computing and/or communication device, a laptop computing device, a desktop computing device, a server, or the like.

Memory elements 410 include one or more physical memory devices such as, for example, local memory 420 and one or more bulk storage devices 425. Local memory 420 refers to RAM or other non-persistent memory device(s) generally used during actual execution of the program code. Bulk storage device(s) 425 can be implemented as a hard disk drive (HDD), solid state drive (SSD), or other persistent data storage device. System 400 also can include one or more cache memories (not shown) that provide temporary storage of at least some program code in order to reduce the number of times program code must be retrieved from bulk storage device 425 during execution.

Input/output (I/O) devices such as a keyboard 440, a display 430, and a pointing device 435 optionally can be coupled to system 400. The I/O devices can be coupled to system 400 either directly or through intervening I/O controllers. One or more network adapters 445 also can be coupled to system 400 to enable system 400 to become coupled to other systems, computer systems, remote printers, and/or remote storage devices through intervening private or public networks. Modems, cable modems, wireless transceivers, and Ethernet cards are examples of different types of network adapters 445 that can be used with system 400.

As pictured in FIG. 4, memory elements 410 can store the components of the system 100 of FIG. 1, namely, the optimization module 115. The optimization module 115, being implemented in the form of executable program code, is executed by system 400 and, as such, is considered an integrated part of system 400. The optimization module 115 can perform the comparing, grouping and/or presenting steps described herein. Moreover, the optimization module 115, including any information, data and/or sub-modules utilized by optimization module 115, are functional data structures that impart functionality when employed as part of system 400.

The information collected by the optimization module 115 can be output to, and stored within, memory elements 410. In this respect, "outputting" and/or "output" can mean storing in memory elements 410, for example, writing to a file stored in memory elements 410, writing to display 430 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The corresponding structures, materials, acts, and equivalents of all means or step plus function elements in the claims below are intended to include any structure, material, or act for performing the function in combination with other claimed elements as specifically claimed. The description of the embodiments disclosed within this specification are presented for purposes of illustration and description, but are not intended to be exhaustive or limited to the form disclosed. Modifications and variations will be apparent to those of ordinary skill in the art without departing from the scope and spirit of the embodiments herein.

What is claimed is:

1. A method comprising:
dividing a geographical area into a virtual grid comprising a plurality of cells, a first cell of the plurality of cells overlapping in corresponding geographical area to a second cell of the plurality of cells;
receiving content to output within one or more of the plurality of cells;
determining a priority score associated with the content and each of the plurality of cells;
determining a relevancy of the content to each cell of the plurality of cells;
assigning content to the plurality of cells based at least in part on the relevancy of each cell of the plurality of cells and the priority score of each of the plurality of cells;
responsive to receiving a request to output content to information playback devices within a selected set of the cells, the selected set of cells defining a content area;
outputting content to an information playback device that is located within a respective one of the selected set of the cells;
identifying one or more underperforming cells within the selected set of cells based at least in part on location data associated with the information playback device; and
adjusting, in response to identifying the one or more underperforming cells, the one or more underperforming cells within the selected set of cells without changing the size and shape of the content area.

2. The method of claim 1, wherein adjusting the one or more underperforming cells within the selected set of cells includes disabling, deactivating or deselecting the one or more underperforming cells.

3. The method of claim 1, wherein adjusting the one or more underperforming cells within the selected set of cells includes altering a configuration of an underperforming cell.

4. The method of claim 1, wherein adjusting the one or more underperforming cells within the selected set of cells includes:
suggesting an adjustment to one or more of the underperforming cells;
responsive to an input, adjusting one or more of the underperforming cells in accordance with the suggestion.

5. The method of claim 1, wherein identifying one or more underperforming cells within the selected set of cells includes:
receiving data related to the content campaign within the selected set of cells; and
comparing at least a portion of the received data to one or more predetermined criteria, wherein cells that do not meet the one or more predetermined criteria are considered underperforming cells.

6. The method of claim 1, wherein identifying one or more underperforming cells within the selected set of cells or adjusting the one or more underperforming cells within the selected set of cells without changing the size and shape of the selected cells is performed in real-time.

7. The method of claim 1, further including offering content placement in the adjusted locations for bidding or purchase.

8. The method of claim 1, wherein adjusting the one or more underperforming cells within the selected set of cells includes eliminating the one or more underperforming cells.

9. The method of claim 1, wherein adjusting the one or more underperforming cells within the selected set of cells includes reshaping at least one of the one or more underperforming cells.

10. The method of claim 1, wherein each of the plurality of cells are substantially uniform.

11. The method of claim 1, further comprising resizing, in response to identifying the one or more underperforming cells, at least one of the plurality of cells.

12. A system comprising:
a processor;
a memory storing instructions executable by the processor to cause the processor configured to:
divide a geographical area into a virtual grid comprising a plurality of cells;
assign content to the plurality of cells based at least in part on the relevancy of the content to each cell of the plurality of cells and a monetary bid associated with the content;
responsive to receiving a request to output content to information playback devices within a selected set of the cells, the selected set of cells defining a content area;
cause content to be output by an information playback device that is located within a respective one of the selected set of the cells;
identify one or more underperforming cells within the selected set of cells based at least in part on location data associated with the information playback device, historical data, and individual traffic sources; and
adjust, in response to identifying the one or more underperforming cells, the content being output to the information playback device located within the one or more underperforming cells within the selected set of cells without changing the size and shape of the content area.

13. The system of claim 12, wherein adjusting the content being output to the information playback device located within the one or more underperforming cells includes altering the content.

14. The system of claim 12, wherein the memory stores additional instructions which when executed the processor, cause the processor to:
apply machine learning automation to assess adjustments that were successful, assess adjustments that were not successful, or predict adjustments to yield better performance.

15. The system of claim 12, wherein adjusting the one or more underperforming cells is performed automatically.

16. The system of claim 12, wherein adjusting the one or more underperforming cells includes:
suggesting an adjustment to one or more of the underperforming cells;
responsive to an input, adjusting one or more of the underperforming cells in accordance with the suggestion.

17. The system of claim 12, wherein identifying one or more underperforming cells includes:
receiving data related to the content campaign within the selected set of cells; and comparing at least a portion of the received data to one or more predetermined criteria, wherein cells that do not meet the one or more predetermined criteria are considered underperforming cells.

18. The system of claim 12, wherein identifying one or more underperforming cells is performed in real-time.

19. The system of claim 12, wherein the memory stores additional instructions which when executed the processor, cause the processor to offer content placement in the adjusted locations for bidding or purchase.

20. The system of claim 12, wherein adjusting the content being output to the information playback device located within the one or more underperforming cells includes adjusting at least one cell of the set of cells associated with delivery of the content.

* * * * *